(12) United States Patent
Park et al.

(10) Patent No.: US 8,354,579 B2
(45) Date of Patent: Jan. 15, 2013

(54) MUSIC LINKED PHOTOCASTING SERVICE SYSTEM AND METHOD

(75) Inventors: Sung-Jin Park, Seoul (KR); Won-Sang Kwon, Seoul (KR); Won-Suk Yang, Seoul (KR); Chan-Seok Yang, Seoul (KR)

(73) Assignee: Samsung Electronics Co., Ltd (KR)

( * ) Notice: Subject to any disclaimer, the term of this patent is extended or adjusted under 35 U.S.C. 154(b) by 393 days.

(21) Appl. No.: 12/696,750

(22) Filed: Jan. 29, 2010

(65) Prior Publication Data

US 2010/0191733 A1 Jul. 29, 2010

(30) Foreign Application Priority Data

Jan. 29, 2009 (KR) ........................ 10-2009-0007024

(51) Int. Cl.
*G10H 1/00* (2006.01)
*G10H 1/18* (2006.01)
*G10H 7/00* (2006.01)
(52) U.S. Cl. ............................. 84/615; 84/612; 707/754
(58) Field of Classification Search .......... 715/730–732; 707/E17.019, 754; 84/612, 615, 635
See application file for complete search history.

(56) References Cited

U.S. PATENT DOCUMENTS

| 6,072,480 | A | * | 6/2000 | Gorbet et al. | 715/730 |
|---|---|---|---|---|---|
| 6,084,169 | A | * | 7/2000 | Hasegawa et al. | 84/600 |
| 7,754,959 | B2 | * | 7/2010 | Herberger et al. | 84/626 |
| 7,952,535 | B2 | * | 5/2011 | Watanabe et al. | 345/2.2 |
| 2003/0085913 | A1 | * | 5/2003 | Ahmad et al. | 345/730 |
| 2005/0158037 | A1 | * | 7/2005 | Okabayashi et al. | 386/96 |
| 2008/0110322 | A1 | * | 5/2008 | Lee et al. | 84/611 |
| 2011/0190913 | A1 | * | 8/2011 | Van De Sluis et al. | 700/94 |
| 2011/0288929 | A1 | * | 11/2011 | Mei et al. | 705/14.42 |
| 2011/0314039 | A1 | * | 12/2011 | Zheleva et al. | 707/767 |

FOREIGN PATENT DOCUMENTS

| KR | 1020000041479 | 7/2000 |
|---|---|---|
| KR | 1020050097371 | 10/2005 |
| KR | 100615522 | 8/2006 |
| KR | 1020080043129 | 5/2008 |

\* cited by examiner

*Primary Examiner* — Jeffrey Donels
(74) *Attorney, Agent, or Firm* — The Farrell Law Firm, P.C.

(57) ABSTRACT

A music linked photocasting service system and method are provided. The music linked photocasting service method includes reproducing music at the request of a user, analyzing a mood of the reproduced music at prescribed times, until music reproduction is completed, searching photographs suitable for a analyzed mood of the music, and displaying the searched photographs.

28 Claims, 5 Drawing Sheets

MUSIC LINKED PHOTOCASTING SERVICE SYSTEM AND METHOD

PRIORITY

This application claims priority under 35 U.S.C. §119(a) to a Korean Patent Application filed in the Korean Intellectual Property Office on Jan. 29, 2009 and assigned Serial No. 10-2009-0007024, the entire disclosure of which is incorporated herein by reference.

BACKGROUND OF THE INVENTION

1. Field of the Invention

The present invention relates generally to a photocasting service system and method, and more particularly, to a music linked photocasting service and method.

2. Description of the Related Art

A photocasting service is provided in several Internet photograph applications and sequentially transmits photographs to users, enabling the users to view a slide show.

In a current photocasting service, photographs are arbitrarily selected and a user passively views the arbitrarily selected photographs. In this case, the order in which photographs are displayed does not correspond to relationships therebetween and thus may fail to continue to capture a user's attention. Therefore, there is needed a method for improving the presentation of photographs in a photocasting service.

SUMMARY OF THE INVENTION

The present invention is designed to address at least the above-mentioned problems and/or disadvantages and to provide at least the advantages described below. Accordingly, an aspect of the present invention provides a system and method for linking a photocasting service with music.

In accordance with an aspect of the present invention, a music linked photocasting service apparatus is provided. The music linked photocasting service apparatus includes a music reproducer for reproducing music, a display for displaying photographs on a screen, a music mood analyzer for analyzing a mood or the reproduced music at prescribed periods until music reproduction is completed, a searcher for searching photograph data corresponding to the analyzed music mood, and a photograph browser for processing the searched photograph data to enable the display to display photographs.

In accordance with another aspect of the present invention, a music linked photocasting apparatus is provided. The music linked photocasting apparatus includes a music reproducer for reproducing music, a music mood analyzer for analyzing a mood of the reproduced music, a server interface connected to a server, for transmitting analyzed music mood data to the server and receiving photograph data from the server, a display for displaying photographs on a screen, and a photograph browser for processing the photograph data to enable the display to display photographs.

In accordance with another aspect of the present invention, a music linked photocasting server is provided. The music linked photocasting server includes a photograph database for storing photograph data, a display for displaying photographs on a screen, a searcher for searching the photograph data in the photograph database according to a music mood, and a user apparatus interface for receiving music mood data from a user apparatus and transmitting the photograph data searched by the searcher to the user apparatus.

In accordance with another aspect of the present invention, a music linked photocasting service method is provided. The music linked photocasting method includes reproducing music at the request of a user, repetitively analyzing a mood of the reproduced music at prescribed times until music reproduction is completed, searching photographs suitable for a mood of the music, and displaying the searched photographs.

BRIEF DESCRIPTION OF THE DRAWINGS

The above and other aspects, features, and advantages of certain embodiments of the present invention will be more apparent from the following description taken in conjunction with the accompanying drawings, in which.

DETAILED DESCRIPTION OF EMBODIMENTS OF THE INVENTION

The present invention will be described in detail herein below with reference to certain embodiments thereof, examples of which are illustrated in the accompanying drawings. Wherever possible, the same reference symbols will be used throughout the drawings to refer to the same or like parts. While the following detailed description includes specific details, such as the number of sound source samples, in order to provide a thorough understanding of the present invention, it will be apparent to those skilled in the art that the present invention may be practiced without such specific details. In some instances, known structures and devices are omitted or are illustrated in block diagram form, focusing on important features of the structures and devices, so as not to obscure the main concepts of the present invention.

Figure 1:
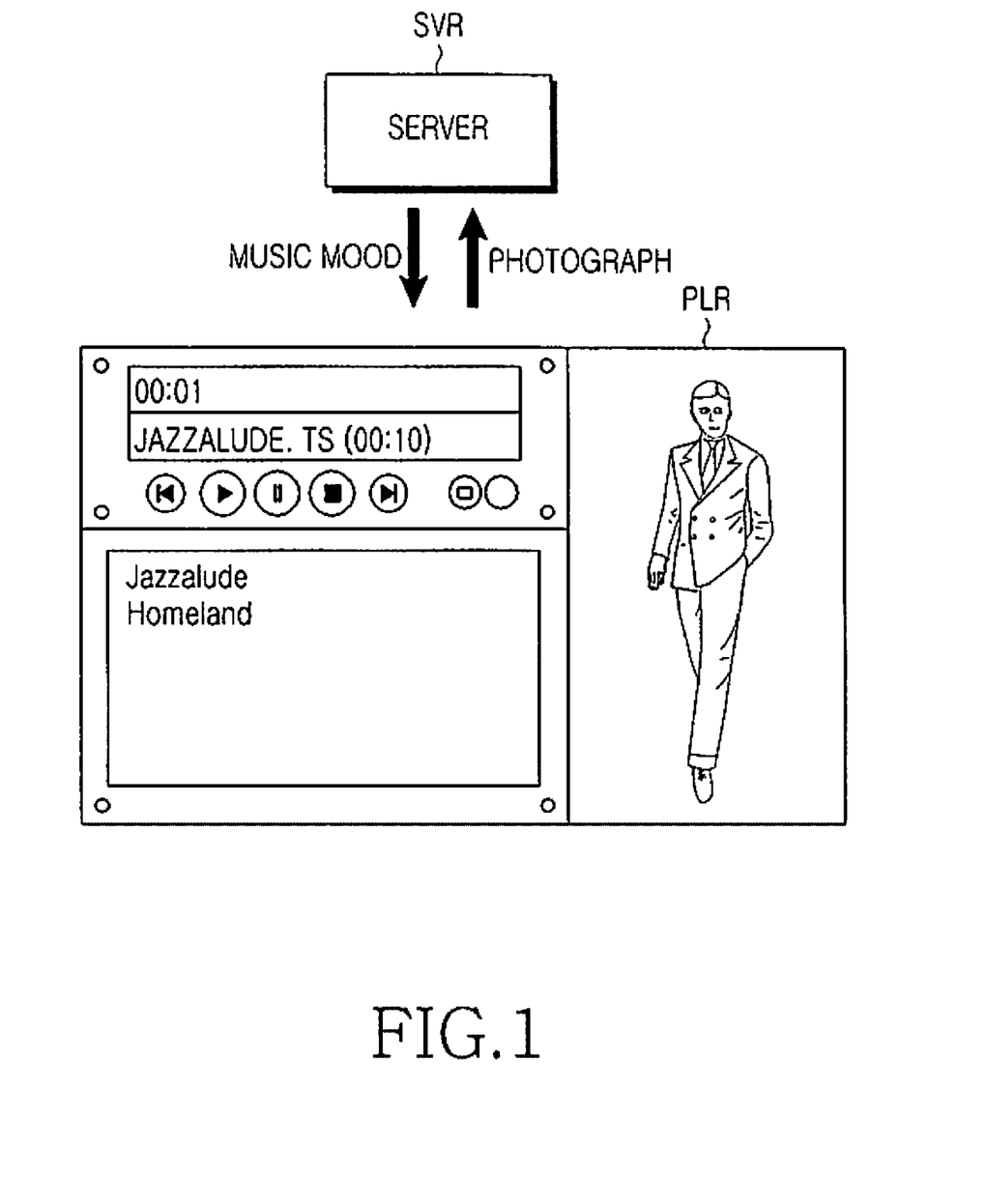
FIG. 1 is a diagram illustrating a music linked photocasting service system according to an embodiment of the present invention.

FIG. 1 is a diagram illustrating a music linked photocasting service system according to an embodiment of the present invention. More specifically, the music linked photocasting service according to an embodiment of the present invention enables a user to watch photographs suitable for a mood of music to which the user is listening.

Referring to FIG. 1, the music linked photocasting service system includes a music linked photocasting server SVR and a user apparatus (or player PLR). The music linked photocasting server SVR and the user apparatus PLR may be wirelessly or wire connected directly to each other or indirectly to each other through a communication network or the Internet.

Figure 2:
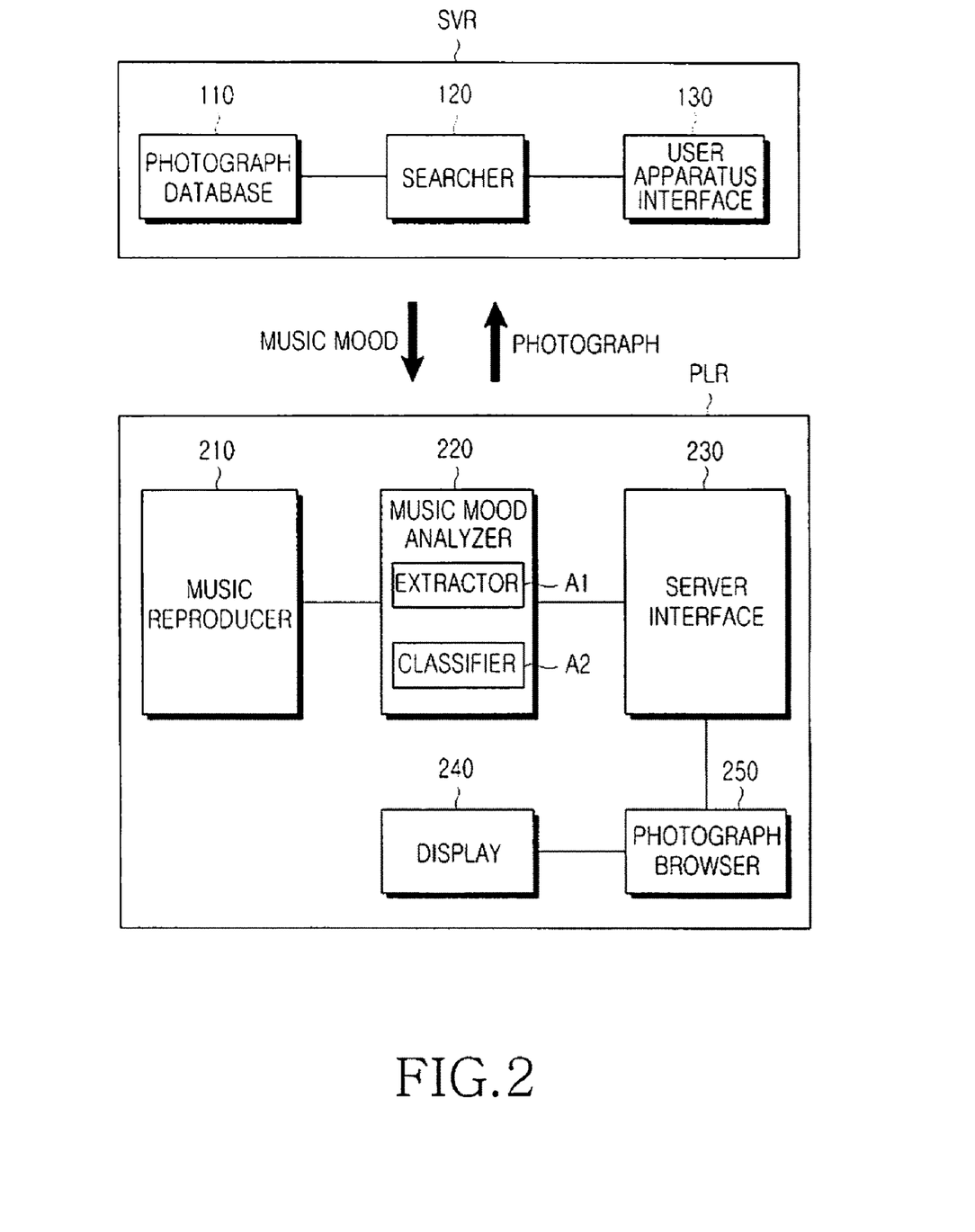
FIG. 2 is a block diagram illustrating a server and a user apparatus as illustrated in FIG. 1, according to an embodiment of the present invention.

FIG. 2 is a block diagram of a server and a user apparatus as illustrated in FIG. 1, according to an embodiment of the present invention.

The music linked photocasting server SVR includes a photograph database 110 for storing photograph data, a searcher 120 for searching the photograph data from the photograph database 110 according to a music mood, and a user apparatus interface 130 for receiving music mood data from the user apparatus and transmitting the photograph data searched by the searcher 120 to the user apparatus.

The photograph data includes images of photographs and at least one image feature value. The image feature value may correspond to a mood value of the music mood data. The photograph data may include images and average brightness of photographs. The average brightness may correspond to a dark-bright mood value of the music mood data. The photograph data may include images and average saturation of photographs. The average saturation may correspond to a calm-energetic mood value of the music mood data. The photograph data may include images, average brightness, and average saturation of photographs. The average brightness may correspond to a dark-bright mood value of the music mood data and the average saturation may correspond to a calm-energetic mood value of the music mood data.

In an operation for searching photographs suitable for a mood of music, the music linked photocasting server SVR analyzes images of photographs, upon storing the photographs in the photograph database 110, and stores average brightness and average saturation together with the photographs in the photograph database 110. The music linked photocasting server SVR accesses and searches the photograph database 110 such that a dark-bright mood value among mood vectors of music transmitted by a user may correspond to the brightness of an image and a calm-energetic mood value thereof may correspond to the saturation of an image. Because the mood value may not accurately correspond to an image feature value, the music linked photocasting server SVR performs a similarity search within a prescribed range of a mood value. After obtaining a plurality of photographs in the above-described process, the music linked photocasting server SVR transmits random photographs from among the plurality of photographs to the user apparatus.

The user apparatus, i.e., a music linked photocasting apparatus, includes a music reproducer 210 for reproducing music, a music mood analyzer 220 for analyzing a mood of the reproduced music, a server interface 230 connected to the music linked photocasting server SVR, for transmitting the analyzed music mood data to the music linked photocasting server SVR and receiving photograph data from the music linked photocasting server SVR, a display 240 for displaying photographs on a screen, and a photograph browser 250 for processing the photograph data received from the music linked photocasting server SVR in order to display photographs on the display 240.

The music mood analyzer 220 includes an extractor A1 for extracting a rhythm pattern and a classifier A2 for classifying a mood using the rhythm pattern. The extractor A1 extracts the rhythm pattern using a sound source sample of a prescribed time.

Figure 3:
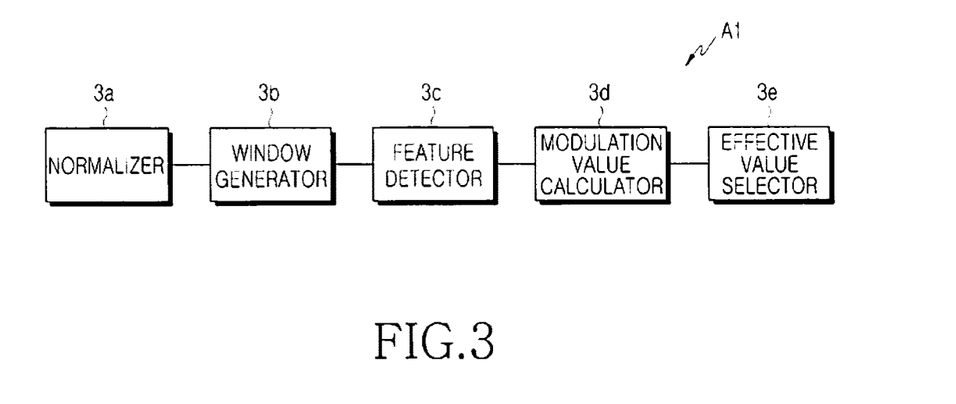
FIG. 3 is a detailed block diagram illustrating an extractor as illustrated in FIG. 2, according to an embodiment of the present invention.

FIG. 3 is a detailed block diagram of an extractor as illustrated in FIG. 2, according to an embodiment of the present invention.

Referring to FIG. 3, the extractor A1 extracts a rhythm pattern using a sound source sample of a prescribed time. The rhythm pattern is a condensed representation of a music sample, enabling a characteristic of the music to be determined from less information.

The extractor A1 includes a normalizer 3a, a window generator 3b, a feature detector 3c, a modulation value calculator 3d, and an effective value selector 3e. The normalizer 3a normalizes music volume, and the window generator 3b repetitively generates a window for gathering a plurality of sound source samples. The feature detector 3c detects an instantaneous spectrum by processing the generated windows, converts the instantaneous spectrum into a frequency interval instantaneous spectrum by adding the instantaneous spectrum in any band interval, for example, in a bark band interval, and converts the frequency interval instantaneous spectrum into a sound pressure (dB) corresponding to a spectrum strength of each frequency interval. The modulation value calculator 3d calculates modulation values according to time from a plurality of frequency interval instantaneous spectrum sound pressures. The effective value selector 3e selects, as effective values, a plurality of modulation values belonging to an audio frequency range among the modulation values generated from the modulation value calculator 3d. For example, the extractor A1 may be constructed with 1,024 sound source samples constituting one window, 24 bands, 512 generated windows, and 60 selected effective values.

Figure 4:
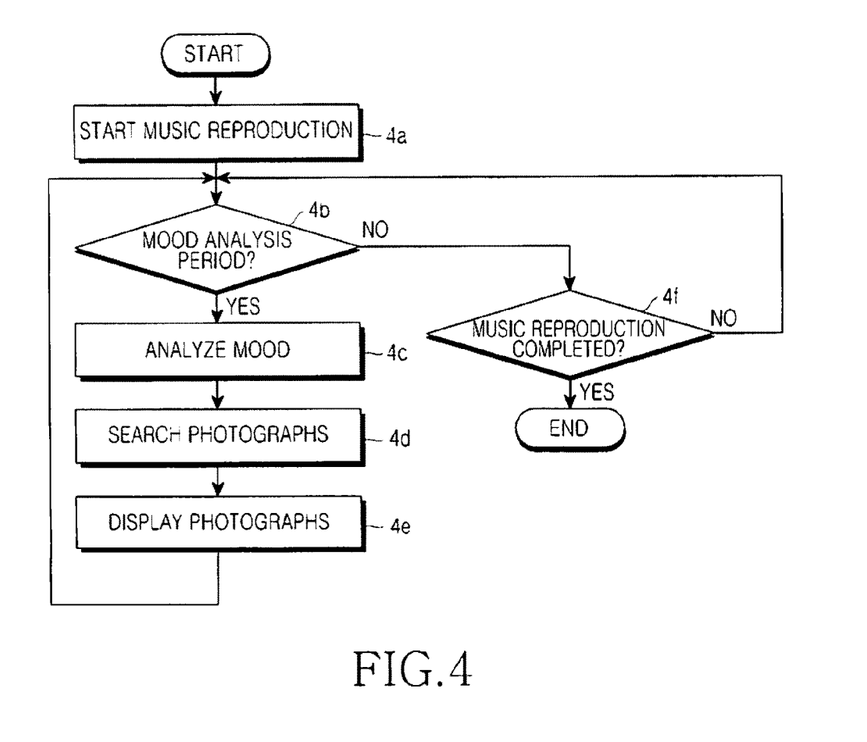
FIG. 4 is a flow chart illustrating a music linked photocasting service method according to an embodiment of the present invention.

FIG. 4 is a flow chart illustrating a music linked photocasting service method according to an embodiment of the present invention.

Referring to FIG. 4, a user apparatus starts music reproduction at the request of a user in step 4a. The user apparatus checks whether a current period is a mood analysis period in step 4b. If yes, the user apparatus analyzes a mood of music in step 4c. When photographs are present in the user apparatus, the user apparatus searches photographs corresponding to the analyzed mood value (suitable for a mood of music) in step 4d. Thereafter, in step 4e, the user apparatus displays the searched photographs corresponding to the analyzed mood value, and then the process returns to step 4b.

When photographs are stored in the music linked photocasting server SVR, the user apparatus transmits the analyzed mood value to the music linked photocasting server SVR. If the analyzed value has been transmitted to the music linked photocasting server SVR, the music linked photocasting server SVR searches photographs in step 4d and transmits the photographs to the user apparatus, which are then displayed in step 4e.

In step 4b, if a current period is not a mood analysis period, the user apparatus checks whether music reproduction is completed in step 4f. If music reproduction is completed, the procedure is ended, and if not, the user apparatus returns to step 4b.

As illustrated in FIG. 4, the process will return to step 4b, until music reproduction is ended.

In step 4c, the operation of analyzing a mood of music by the music mood analyzer 220 may be broadly classified into feature extraction process and mood classification process as will be described below.

A rhythm pattern is extracted from music in order to determine a feature of the music for music mood analysis. More specifically, the extractor A1 extracts a rhythm pattern using a sound source sample of for example, about a 6-second interval.

Figure 5:
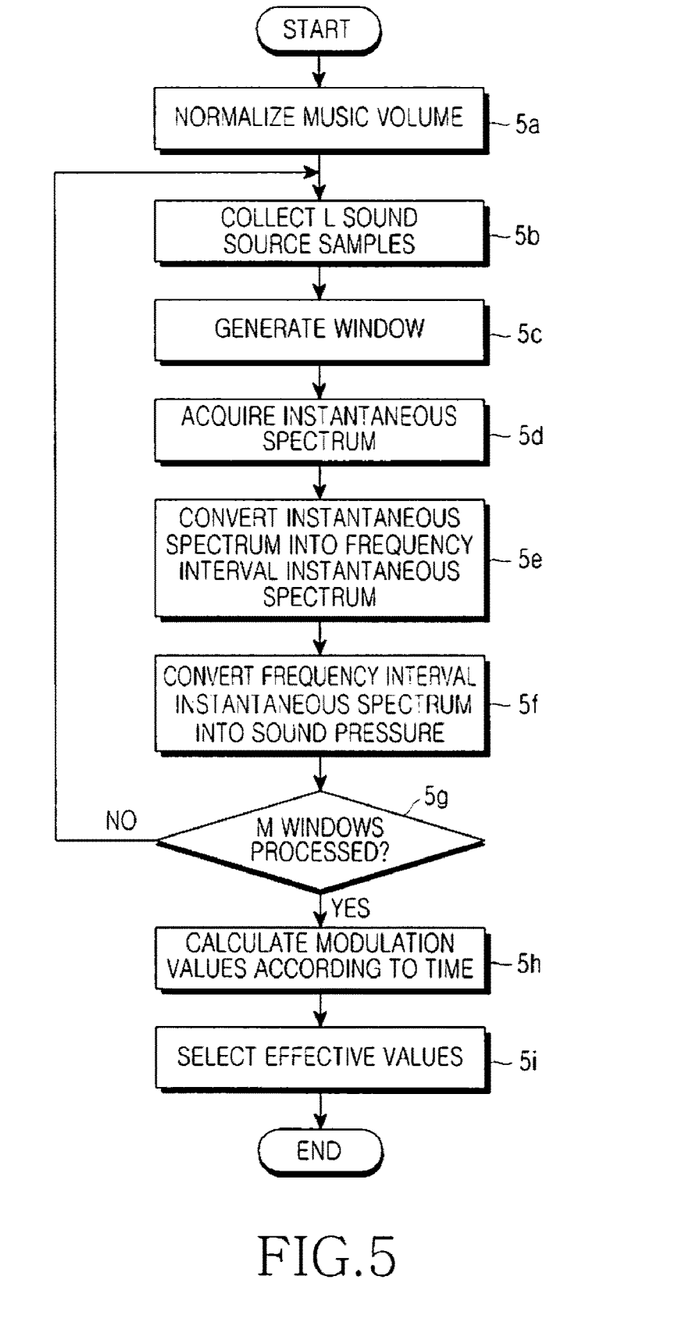
FIG. 5 is a flow chart illustrating a rhythm pattern extracting process according to an embodiment of the present invention.

FIG. 5 is a flow chart illustrating a rhythm pattern extracting process according to an embodiment of the present invention.

Referring to FIG. 5, for a stereophonic sound source, the extractor A1 of the music mood analyzer 220 adds sound sources of left and right channels and normalizes music volume in step 5a. For example, if a maximum volume is 1, a sample may be normalized to a value between 0 and 1.

The extractor collects L sound source samples in step 5b. As a first example, 1,024 samples are collected based on a sound source of 44.1 kHz. As a second example, 512 samples may be used based on a sound source of 22.05 kHz.

The extractor generates one window using 1,024 sound source samples in step 5c.

The extractor acquires an instantaneous spectrum by performing Short-Time Fast Fourier Transform (STFFT) upon the window in step 5d.

The extractor converts the instantaneous spectrum into a frequency interval instantaneous spectrum by adding the instantaneous spectrum in, for example, 24 bark bands (24 musical scales) or 30 different band intervals in step 5e.

The extractor converts the frequency interval instantaneous spectrum into a sound pressure (dB) by taking the log of a spectrum strength of each frequency interval in step 5f.

The extractor checks whether M windows have been processed in step 5g. If not, the extractor returns to step 5b. Using the first example described above, where 1,024 samples are collected based on a sound source of 44.1 kHz, M is 512.

If 512 windows have been processed, the extractor calculates modulation values according to time by performing Fast Fourier Transform (FFT) upon frequency interval instantaneous spectrum sound pressures on a time axis in step 5f.

The extractor selects 60 modulation values except for the first modulation value (because it is a DC component) among the modulation values according to time in step 5i. The 60 modulation values correspond to 0 to 10 Hz, to which humans are most sensitive. The other modulation values are discarded because they belong to a range that is difficult for humans to hear.

Through steps 5a to 5f, 1,024 sound source samples, i.e., pieces of information, are condensed into 24 features. One window corresponds to time of about 23 ms (1,024/44,100=512/22,050=23). Accordingly, such an interval is selected for the efficiency of STFFT.

A window is constructed by gathering 1,024 sound source samples and then steps 5b to 5f are repeated until 512 windows have been processed in step 5g. In this case, the window overlaps a previous window by samples of 50%.

Figure 6:
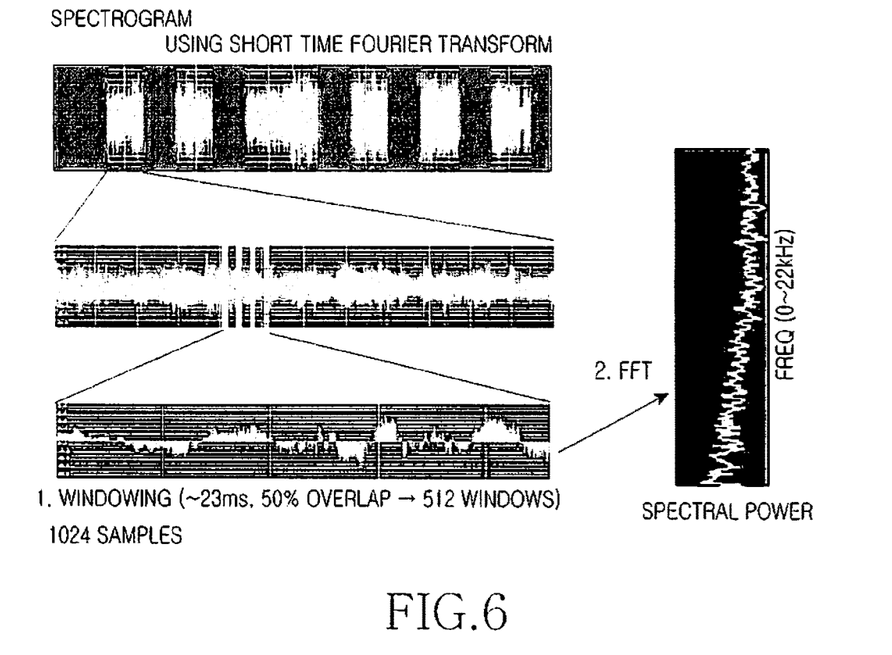
FIG. 6 is a diagram illustrating a spectrogram for explaining instantaneous spectrum calculation using a windowing method, according to an embodiment of the present invention.

FIG. 6 is a diagram illustrating a spectrogram for explaining instantaneous spectrum calculation using a windowing method, according to an embodiment of the present invention.

If the 512 windows have been processed, frequency interval instantaneous spectrum sound pressures are obtained in a total of 512 windows. The 512 windows correspond to about 5.96 seconds, when overlap of 50% between 511 windows is considered.

If the 512 windows have been processed, a total of 262,656 {(1,024×512)−(512×511)=262,656: the number of actually used pieces of information considering overlap} pieces of information are condensed into 1,440 (=24×60) features. This will be referred to as a rhythm pattern.

Although the number of different mood types classified by the classifier A2 may vary, for ease of description, it is assumed that there are four mood types for photograph searching and linking, e.g., dark, bright, calm, and energetic. Among the four mood types, dark is opposite to bright, and calm is opposite to energetic.

Moods are labeled to a plurality of pieces of music for learning. The pieces of music for learning are arbitrarily selected and more than 1000 pieces of music may be effective. The more pieces of music that are learned the better the performance. Each user participating in labeling listens to pieces of music and assigns dark or bright, and calm or energetic labels to each piece of music. Thus, each piece of music has two labels. If multiple users participate in labeling and if many pieces of music are selected, pieces of music, opinions of which are similar, can be filtered.

A Support Vector Machine (SVM), which is a mechanical learning algorithm, is used. If pieces of music for learning are much more than the number (=1440) of features, for example, if the number of pieces of music is about 6,000 which is about 4 times the number of features, a radial basis kernel may be used, and if not, a linear kernel may be used. When separately learning dark music from bright music, pieces of music may be classified into dark and bright moods, and when separately learning calm music from energetic music, pieces of music may be classified into calm and energetic moods.

Various types of moods obtained through the above processes may be distributed to a user and are used in the music linked photocasting apparatus. The music linked photocasting apparatus obtains a rhythm pattern using a recent 6-second interval of listening music and acquires mood values in a dark-bright axis and a calm-energetic axis.

Figure 7:
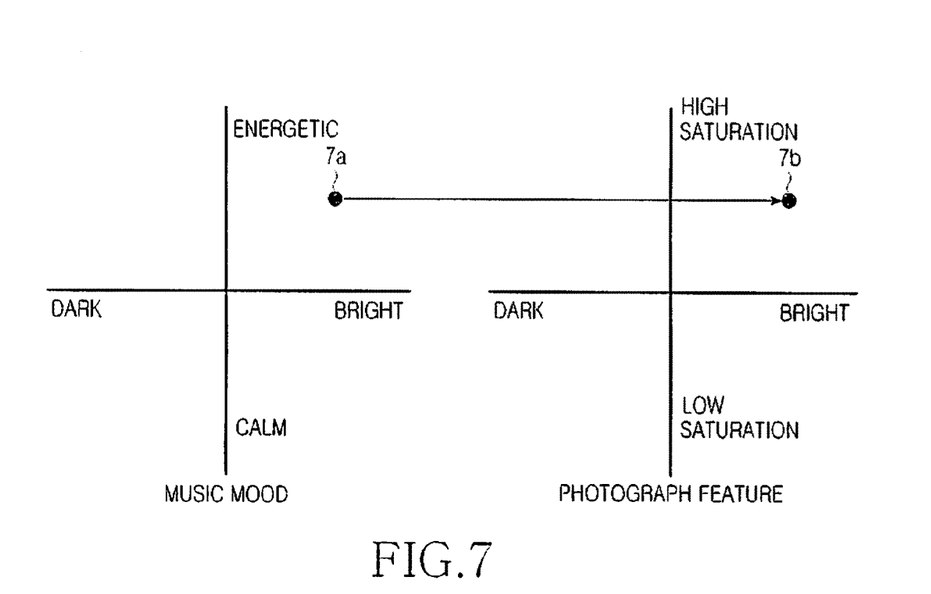
FIG. 7 is a diagram illustrating a corresponding relationship between a music mood vector and a photograph feature vector, according to an embodiment of the present invention.

FIG. 7 is a diagram illustrating a corresponding relationship between a music mood vector and a photograph feature vector, according to an embodiment of the present invention.

Referring to FIG. 7, for example, a photograph having a bright-high saturation feature 7b corresponding to a music mood having a bright-energetic feature 7a is displayed.

In accordance with another embodiment of the present invention, the role of the music linked photocasting server SVR may be implemented by a personal computer instead of an Internet server. Then, an application may be achieved such that a slide show for personal photographs suitable for music is automatically displayed. In this case, the server and the user apparatus may be integrally formed to provide a music linked photocasting service apparatus. The music linked photocasting service apparatus may include a music reproducer for reproducing music, a display for displaying photographs on a screen, a music mood analyzer for analyzing a mood of the reproduced music every prescribed period until music reproduction is completed, a searcher for searching photograph data corresponding to the analyzed music mood, and a photograph browser for processing the searched photograph data to enable the display to display photographs. A detailed operation of theses constituents is not different from that of the above-described server SVR and the user apparatus in terms of a music linked photocasting service.

As described above, the present invention enables users to enjoy a photocasting service in which photographs are displayed that correspond to a mood of music currently being listened to. For example, in an introduction part of calm and dark music, dark and low saturation photographs may be displayed, and in a middle part of energetic music, bright photographs may be displayed, thereby capturing user attention and maintaining user interest.

Although the certain embodiments of the present invention have been disclosed for illustrative purposes, various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A music linked photocasting service apparatus, comprising:

a music reproducer for reproducing music;

a display for displaying photographs on a screen;

a music mood analyzer for analyzing a mood of the reproduced music at prescribed periods, until music reproduction is completed;

a searcher for searching photograph data corresponding to music mood data of the analyzed music mood; and
a photograph browser for processing the searched photograph data to enable the display to display photographs from the processed photograph data,
wherein the photograph data comprises images of photographs and average brightness of the photographs, and
wherein the average brightness corresponds to a dark-bright mood value of the music mood data.

2. The music linked photocasting service apparatus according to claim 1, wherein the photograph data further comprises:
average saturation of the photographs,
wherein the average saturation corresponds to a calm-energetic mood value of the music mood data.

3. The music linked photocasting service apparatus according to claim 1, wherein the music mood analyzer comprises:
an extractor for extracting a rhythm pattern from the reproduced music; and
a classifier for classifying a mood using the rhythm pattern.

4. The music linked photocasting service apparatus according to claim 3, wherein the extractor extracts the rhythm pattern using a sound source sample of a prescribed time.

5. The music linked photocasting service apparatus according to claim 3, wherein the extractor comprises:
a normalizer for normalizing music volume;
a window generator for repeatedly generating a window by gathering a plurality of sound source samples;
a feature detector for detecting an instantaneous spectrum by processing the generated window, converting the instantaneous spectrum into a frequency interval instantaneous spectrum by adding the instantaneous spectrum in a band interval, and converting the frequency interval instantaneous spectrum into a sound pressure corresponding to a spectrum strength of each frequency interval; and
a modulation value calculator for calculating modulation values over time from a plurality of frequency interval instantaneous spectrum sound pressures corresponding to windows, if a number of the generated windows is greater than a predetermined number.

6. The music linked photocasting service apparatus according to claim 5, wherein the feature detector detects the instantaneous spectrum by performing short-time fast Fourier transform upon the generated window.

7. The music linked photocasting service apparatus according to claim 5, wherein the band interval is a 24 bark band interval.

8. The music linked photocasting service apparatus according to claim 5, wherein the feature detector converts the frequency interval instantaneous spectrum into the sound pressure by taking a log of a spectrum strength of each frequency interval.

9. The music linked photocasting service apparatus according to claim 5, wherein a current window overlaps a previous window by samples of about 50%.

10. The music linked photocasting apparatus according to claim 5, further comprising:
an effective value selector for selecting, as effective values, values belonging to a predetermined audio frequency range among the modulation values generated by the modulation value calculator.

11. The music linked photocasting service apparatus according to claim 5, wherein the extractor adds sound sources of left and right channels for a stereophonic sound source and normalizes the added sound sources for each sample.

12. The music linked photocasting service apparatus according to claim 1, further comprising an Internet connection with a server.

13. A music linked photocasting apparatus, comprising:
a music reproducer for reproducing music;
a music mood analyzer for analyzing a mood of the reproduced music;
a server interface connected to a server, for transmitting analyzed music mood data to the server and receiving photograph data from the server;
a display for displaying photographs on a screen; and
a photograph browser for processing the photograph data from the server to enable the display to display photographs from the processed photograph data,
wherein the music mood analyzer comprises an extractor for extracting a rhythm pattern from the reproduced music and a classifier for classifying the mood using the rhythm pattern.

14. The music linked photocasting apparatus according to claim 13, wherein the extractor extracts the rhythm pattern using a sound source sample of a prescribed time.

15. The music linked photocasting apparatus according to claim 13, wherein the extractor comprises:
a normalizer for normalizing music volume;
a window generator for repeatedly generating a window by gathering a plurality of sound source samples;
a feature detector for detecting an instantaneous spectrum by processing the generated window, converting the instantaneous spectrum into a frequency interval instantaneous spectrum by adding the instantaneous spectrum in a band interval, and converting the frequency interval instantaneous spectrum into a sound pressure corresponding to a spectrum strength of each frequency interval; and
a modulation value calculator for calculating modulation values over time from a plurality of frequency interval instantaneous spectrum sound pressures corresponding to windows, if a number of the generated windows is greater than a predetermined number.

16. The music linked photocasting apparatus according to claim 15, wherein the feature detector detects the instantaneous spectrum by performing short-time fast Fourier transform upon the generated window.

17. The music linked photocasting apparatus according to claim 15, wherein the band interval is a 24 bark band interval.

18. The music linked photocasting apparatus according to claim 15, wherein the feature detector converts the frequency interval instantaneous spectrum into the sound pressure by taking a log of a spectrum strength of each frequency interval.

19. The music linked photocasting apparatus according to claim 15, wherein a current window overlaps a previous window by samples of about 50%.

20. The music linked photocasting apparatus according to claim 15, further comprising:
an effective value selector for selecting, as effective values, values belonging to a predetermined audio frequency range among the modulation values generated by the modulation value calculator.

21. The music linked photocasting apparatus according to claim 15, wherein the extractor adds sound sources of left and right channels for a stereophonic sound source and normalizes the added sound sources for each sample.

22. The music linked photocasting apparatus according to claim 13, wherein connection with the server is an Internet connection.

23. A music linked photocasting server, comprising:
a photograph database for storing photograph data;

a display for displaying photographs;

a searcher for searching the photograph data from the photograph database according to a music mood; and a user apparatus interface for receiving music mood data from a user apparatus and transmitting searched photograph data by the searcher that corresponds to the music mood data to the user apparatus, wherein the photograph data comprises images of photographs and average saturation of the photographs, and wherein the average saturation corresponds to a calm-energetic mood value of the music mood data.

24. The music linked photocasting server according to claim 23, wherein the photograph data further comprises:

average brightness of the photographs, wherein the average brightness corresponds to a dark-bright mood value of the music mood data.

25. The music linked photocasting server according to claim 23, wherein the photograph data comprises:

images of photographs;

average brightness of the photographs; and average saturation of the photographs, wherein the average brightness corresponds to a dark-bright mood value of the music mood data, and wherein the average saturation corresponds to a calm-energetic mood value of the music mood data.

26. A music linked photocasting service method for music linked photocasting service apparatus, the method comprising:

receiving a request from a user to reproduce music;

reproducing the music;

repeatedly analyzing a mood of the reproduced music at prescribed times, until music reproduction is completed;

repeatedly searching photographs suitable for an analyzed mood of the music; and repeatedly displaying the searched photographs, wherein repeatedly analyzing the mood of the reproduced music comprises:

extracting a rhythm pattern from the reproduced music; and detecting a corresponding mood value by analyzing the extracted rhythm pattern according to a preset mood classification reference.

27. The music linked photocasting service method according to claim 26, wherein extracting the rhythm pattern comprises:

normalizing music volume of the reproduced music;

collecting a predetermined number of sound source samples from the reproduced music;

generating a window using the collected samples;

acquiring instantaneous spectrum by processing the window;

converting the instantaneous spectrum into a frequency interval instantaneous spectrum by adding the instantaneous spectrum in a band interval;

converting the frequency interval instantaneous spectrum into a sound pressure;

checking whether a predetermined number of windows have been processed, and if not, returning to the collection of the sound source samples, and if yes, calculating modulation values over time from corresponding sound pressures; and selecting effective values from the modulation values.

28. The music linked photocasting service method according to claim 27, wherein a current window generated overlaps a previous window by samples of about 50%.

\* \* \* \* \*